United States Patent [19]

Pearce

[11] Patent Number: 4,565,637

[45] Date of Patent: Jan. 21, 1986

[54] METHOD OF, AND APPARATUS FOR, FILTERING A SLURRY

[75] Inventor: Kenneth W. Pearce, Hartlepool, England

[73] Assignee: Steetley Refractories Limited, England

[21] Appl. No.: 562,010

[22] Filed: Dec. 16, 1983

[30] Foreign Application Priority Data

Dec. 22, 1982 [GB] United Kingdom ............... 8236501

[51] Int. Cl.$^4$ ...................... B01D 37/00; C02F 1/00
[52] U.S. Cl. .................... 210/770; 210/228; 210/231; 210/350; 210/385; 210/780; 100/211
[58] Field of Search .............. 210/780, 770, 228, 231, 210/350, 351, 384, 385, 388, 359, 785, 354; 100/211

[56] References Cited

U.S. PATENT DOCUMENTS

| | | | |
|---|---|---|---|
| 1,705,908 | 7/1927 | Witt | 210/356 |
| 3,180,825 | 4/1965 | Couvreur et al. | 210/351 |
| 3,613,563 | 10/1971 | Sumskay et al. | 100/211 |
| 3,655,049 | 4/1972 | Krachlaner | 210/388 |
| 3,695,440 | 10/1972 | Mori | 210/228 |
| 3,807,567 | 4/1974 | Iwatani | 210/231 |
| 3,957,645 | 5/1976 | Karita et al. | 210/231 |
| 4,397,746 | 8/1983 | Kratochvil | 210/228 |

FOREIGN PATENT DOCUMENTS

| | | | |
|---|---|---|---|
| 708441 | 4/1965 | Canada | 210/228 |
| A 2724508 | 11/1955 | European Pat. Off. . | |
| A 1363465 | 5/1963 | European Pat. Off. . | |
| A 0027910 | 5/1964 | European Pat. Off. . | |
| 3027997 | 3/1982 | Fed. Rep. of Germany | 210/416.1 |
| 1344160 | 1/1974 | United Kingdom . | |
| 1422390 | 1/1976 | United Kingdom . | |
| 1433764 | 4/1976 | United Kingdom | 210/356 |
| 1512960 | 5/1978 | United Kingdom . | |
| 2077131 | 12/1981 | United Kingdom . | |

Primary Examiner—Arnold Turk
Assistant Examiner—Titus B. Ledbetter, Jr.
Attorney, Agent, or Firm—Bacon & Thomas

[57] ABSTRACT

Filter cake formed from a slurry is dried in a filter press comprising a plurality of filtration units each having a chamber bounded by a pair of opposed flexible walls with at least one of said walls being constituted by a filter medium. The flexible walls are sandwiched between flexible membranes. The filter cake is formed and compressed in the chambers by hydraulic fluid pressure acting on the flexible membranes. By means of pressure oscillations set up in the hydraulic fluid, the filter cake in the chambers is deformed by bowing from side to side of an initial central plane, whereby drying is improved.

9 Claims, 1 Drawing Figure

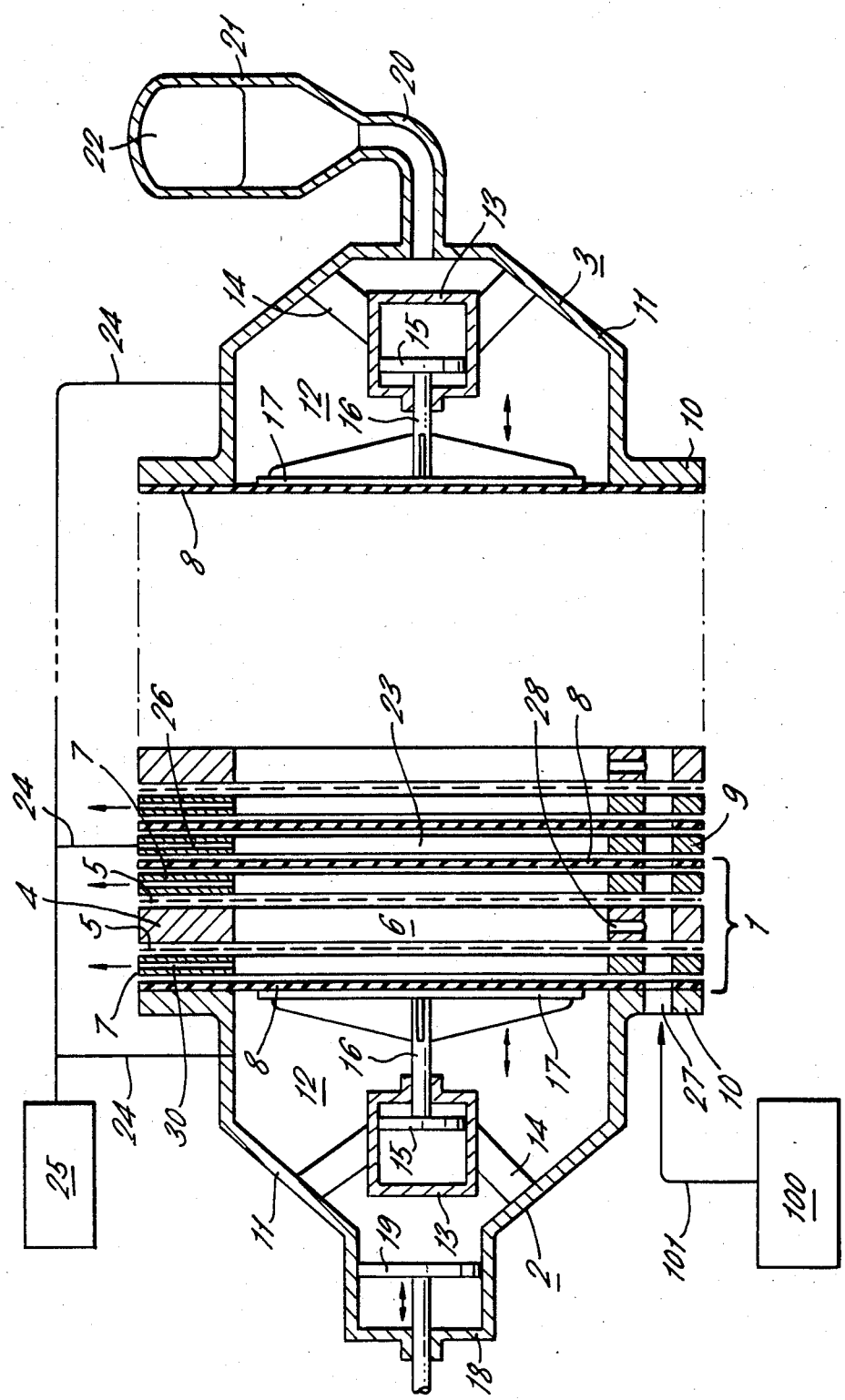

METHOD OF, AND APPARATUS FOR, FILTERING A SLURRY

This invention relates to a method of, and apparatus for, filtering a slurry.

It is known, see for example GB-A-1422390 and GB-A-1512960, to filter a slurry by compressing the slurry between a pair of opposed filter members in the form of continuous belts, the slurry being introduced between the belts while they are relatively widely spaced apart, and the belts then being moved towards each other thereby to compress the slurry and effect filtering thereof. The belts with the filter cake formed from the slurry between them, are then passed along a sinuous path over and between a plurality of rollers thereby to dry the filter cake as much as possible the filter cake then being removed from between the belts which are separated and returned to the slurry entry position.

It is also known, see for example GB-A-2077131, for a filter cake formed from a slurry on a filter medium in a rotary drum or moving belt filter, or in a filter press, to be subjected to vibration while held against a relatively rigid surface. Vibration of the filter cake is effected either by a vibrating roller in engagement with the filter cake, or by means of an oscillating pressure induced in a hydraulic fluid which exerts pressure on one side of the filter cake through a flexible member. Such vibration of the filter cake is said to achieve an improvement in the dryness of the filter cake.

According to this invention a method of filtering a slurry, comprises confining filter cake produced from the slurry in a stationary chamber having a pair of opposed flexible walls at least one of which is constituted by a filter medium; compressing the filter cake in the chamber; and cyclically deforming the filter cake while under compression in the chamber by acting on at least one of said walls of the chamber to cause the filter cake to bow to either side of an initial central plane alternately.

Preferably the filter cake in the chamber is compressed by hydraulic fluid pressure acting on at least one of said walls of the chamber, in which case said cyclic deformation of the filter cake can be effected by pressure oscillations induced in said hydraulic fluid pressure.

Filter cake can be formed in the chamber by initial compression of slurry in the chamber.

Also according to this invention there is provided apparatus for filtering a slurry, comprising a chamber having a pair of opposed flexible walls at least one of which is constituted by a filter medium; means to maintain filter cake produced from the slurry under compression in the chamber; and means cyclically to deform the filter cake while under compression in the chamber by acting on at least one of said walls of the chamber to cause the filter cake to bow to either side of an initial central plane alternately.

This invention will now be described by way of example with reference to the drawing which is a diagrammatic cross-sectional view of a filter press embodying the invention.

Referring to the drawing, the filter press comprises a series of filtration units 1 arranged in line between a pair of end covers 2 and 3.

Each unit 1 comprises a central annular member 4 of metal sandwiched between a pair of flexible filter media 5 formed, for example, of moulded or woven plastics material or woven metal mesh. The member 4 and filter media 5 together define a chamber 6, with the filter media 5 constituting a pair of opposed flexible walls of the chamber 6.

The filter media 5 are held against the central member 4 by respective ones of a pair of outer annular members 7 of metal, the outer members 7 being thinner than the central member 4, and each having a radial outlet bore 30 therein.

Each unit 1 is completed by a pair of flexible membranes 8 between which the other members of the unit 1 are sandwiched, the membranes 8 being made of, for example, moulded and reinforced natural or synthetic rubber, or moulded and reinforced plastics material.

Typically, the complete filter press will include ten or more of the filtration units 1 sandwiched between the end covers 2 and 3, with adjacent units 1 being separated by annular spacer members 9.

Each end cover 2 or 3 has an annular flange 10 which engages the outer flexible membrane 8 of the adjacent unit 1, and a bell portion 11 defining a cavity 12.

Each cavity 12 contains a hydraulic piston and cylinder arrangement, the cylinder 13 of the arrangement being rigidly mounted on the associated end cover 2 or 3 by struts 14, and the piston 15 of the arrangement having a piston rod 16 carrying at its free end a pressure plate 17. Each piston and cylinder arrangement 13, 15 is operative to move the associated pressure plate 17 from a position as shown in the drawing in which it engages the outer flexible membrane 8 of the adjacent unit 1 thereby to prevent outward bowing of the flexible membrane 8, to a position retracted from the flexible membrane 8 to permit bowing thereof.

The end cover 2 terminates in a cylindrical portion 18 which serves as a cylinder containing a piston 19 moveable from outside the end cover 2.

The end cover 3 terminates in a pipe 20 which leads to a closed housing 21 containing a compressible gas filled accumulator 22.

The cavities 12 within the end covers 2 and 3, and the spaces 23 defined by the spacer members 9 between adjacent filtration units 1, are filled with hydraulic fluid and are connected by lines 24 to a hydraulic pump 25. The spacer members 9 are each formed with a radial bore 26 by which the space 23 within the spacer member 9 is connected to the associated line 24.

A supply bore 27 extends from an inlet through the flange 10 of the end cover 2, and through all the members of each of the filtration units 1, and terminates at a closed end at the flexible membrane 8 sealing the cavity 12 in the end cover 3.

The chamber 6 of each of the filtration units 1 is connected to the supply bore 27 by a feed bore 28 extending radially through the central member 4 of the unit 1.

In use of the filter press, slurry to be filtered is fed into the supply bore 27 by means of a pump 100 along a pipe 101. The slurry passes by way of the feed bores 28 to fill the chambers 6 of the units 1, the pressure plates 17 of the piston and cylinder arrangements 13, 15 being in the positions shown in the drawing.

The slurry is compressed in the chambers 6 under the action of the pump 100, and liquid in the slurry is displaced through the filter media 5 into the spaces defined by the outer members 7, and then out of the filter press through the outlet bores 30 in the outer members 7.

The supply pipe 101 is then closed and the hydraulic pump 25 operated to cause the hydraulic fluid in the cavities 12 in the end covers 2 and 3 and in the spaces 23 defined by the spacer members 9, further to compress the filter cakes now formed in the chambers 6 of the units 1 to displace more liquid from the filter cakes.

The pressure plates 17 are then withdrawn by means of the associated piston and cylinder arrangements 13, 15 out of contact with the adjacent flexible membrane 8, while the pressure is maintained in the hydraulic fluid in the cavities 12 and spaces 23 by the hydraulic pump 25.

Pressure oscillations are then set up in the hydraulic fluid in the cavity 12 in the end cover 2 by reciprocation of the piston 19. The flexible membrane 8 closing the cavity 12 in the end cover 2 is caused to bow to either side of its initial central plane alternately, about its periphery, by the pressure waves, and this movement is transmitted through all of the units 1 to the now unsupported flexible membrane 8 closing the cavity 12 in the end cover 3. The filter cakes in the chambers 6 of the units 1 are thus also subjected to the bowing in alternate directions, this resulting in still further liquid being displaced from the filter cakes.

The pressure oscillations induced in the cavity 12 in the end cover 3 are absorbed by the compressible gas filled accumulator 22.

When no more liquid is being displaced from the filter cakes they are removed from the filter press in known manner by dismantling of the press, whereafter the press is rebuilt and prepared for further use.

Although in the method described above slurry is initially introduced into the chambers 6 of the filtration units, the chambers 6 can otherwise be initially loaded with pre-formed filter cake produced, for example, with a vacuum filtration apparatus, such a method having the advantage that the production capacity of the press is increased for the same reduction in liquid content of the treated filter cake.

As a modification of the filter press described above means can be provided to restrain movement of the centers of the flexible membranes 4 and the filter media 5 whereby they, and thus also the filter cake in the chambers 6, are caused to bow about their centers and peripheries under the action of the oscillating hydraulic pressure induced by the piston 19.

The amount of liquid displaced from filter cake using the method and apparatus described above is dependent upon the frequency and amplitude of the pressure oscillations induced in the hydraulic fluid pressure by the piston 19. A suitable frequency range is from 0.05 to 1000 cycles per second, and a suitable amplitude range is from 10% to 0.001% of the unsupported dimension of the flexible membrane 8 to which the oscillations are imparted (the unsupported diamter of the flexible membrane 8 in the drawing). The preferred frequency range is from 0.1 to 1% cycles per second, while the preferred amplidtude range is from 10% to 1% of the unsupported membrane dimension.

Examples comparihg the use of a conventional filter press with use of a filter press embodying this invention will now be described.

The Examples A and B illustrate the use of a convential filter press.

EXAMPLE A

Magnesium hydroxide rotary vacuum filter cake was placed in the chamber of a filter press and there squeezed at a pressure of 150 psig for 3 minutes. The original liquid content of the cake was reduced from 45.0% to 36.3% (by weight).

EXAMPLE B

A magnesium hydroxide rotary vacuum filter cake was pressed in a convetional filter press at 300 psig for 3 minutes. The liquid content of the cake was reduced from 46% by weight to 35% by weight.

The following Examples 1 and 2 illustrate the use of a filter press embodying this invention.

EXAMPLE 1

A filter cake was formed as in Example A and this was squeezed also at 150 psig for 3 minutes. The filter cake was then treated in a filter press embodying this invention as described above with pressure oscillations at 2 1/6 cycles per sec and with an amplitude of 1/16 of the diameter of the flexible membranes. The liquid content of the cake was reduced from 44.8% to 30.1% (by weight).

EXAMPLE 2

A filter cake was formed as in Example B and was then treated in a filter press embodying this invention as in Example 1. The liquid content of the filter cake was reduced from 46% to 28% (by weight).

The method and apparatus of this invention can be used with advantage for the filtration of magnesium hydroxide slurries obtained, for example, from sea water. The filter cake produced is usually dense and upon calcining or dead burning gives magnesia with granules of relatively large dimensions.

I claim:

1. A method of filtering a slurry, comprising confining filter cake produced from the slurry in a stationary chamber having a pair of opposed flexible walls at least one of which is constituted by a filter medium compressing the filter cake in the chamber by hydraulic fluid pressure acting on said walls; and cyclically deforming the filter cake, while under compression in the chamber by said hydraulic fluid pressure inducing pressure oscillations in said hydraulic fluid acting on said walls of the chamber to cause the filter cake to bow alternately from side to side of an initial central plane.

2. A method as claimed in claim 1, inwhich filter cake is formed in the chamber by initial compression of slurry in the chamber.

3. Appartus for filtering a slurry, comprising a chamber having a pair of opposed flexible walls at least one of which is constituted by a filter medium; means to maintain filter cake produced from the slurry under compression in the chamber by hydraulic fluid pressure acting on said walls; and means cyclically to deform the filter cake, while under compression in the chamber by said hydraulic fluid pressure, by inducing pressure oscillations in said hydraulic fluid acting on said walls of the chamber to cause the filter cake to bow alternately from side to side of an initial central plane.

4. Apparatus as claimed in claim 3, in which the chamber is constituted by a filtration unit comprising a central annular member sandwiched between a pair of filter media, the central annular member and filter media together defining the chamber, a pair of outer annular members each serving to hold a respective filter medium against the central annular member, all of which are sandwiched between a pair of flexible membranes.

5. Apparatus as claimed in claim 4, comprising a plurality of said filtration units arranged in a row with adjacent units separated by annular spacer members, the row of units being sandwiched between a pair of end covers, a supply bore in communication with the chamber of each unit for introduction of slurry, and an outlet bore in each outer annular member of each unit for the removal of liquid from the space defined by each other annular member of each unit and the filter medium and flexible membrane being in contact therewith.

6. Appartus as claimed in claim 5, in which the end covers each define a cavity closed by the outer flexible membrane of the adjacent filtration unit, said cavities and the spaces defined by the spacer members and the adjacent flexible membrane being filled with hydraulic fluid and connected to a pump by which the hydraulic fluid can be pressurized.

7. Apparatus as claimed in claim 6, in which each said cavity contains a piston and cylinder arrangement having a pressure plate connected thereto, and operative to move the pressure plate between a position in contact with the flexible membrane closing the associated cavity thereby to prevent outward bowing of said flexible membrane, and a position remote from said flexible membrane such that said flexible membrane can bow.

8. Apparatus as claimed in claim 6, in which one of said end covers contains a piston by which pressure oscillations can be set up in said hydraulic fluid, said pressure oscillations effecting said bowing of the filter cake in the chambers of the filtration units.

9. Apparatus as claimed in claim 8, in which the other of said end covers has connected thereto a compressible gas filled unit operative to absorb said pressure oscillations transmitted to the hydraulic fluid in the cavity in said other end cover through the filtration units.

* * * * *